US008719200B2

(12) United States Patent
Beilby et al.

(10) Patent No.: US 8,719,200 B2
(45) Date of Patent: May 6, 2014

(54) CYBERPERSONALITIES IN ARTIFICIAL REALITY

(75) Inventors: Liesl Jane Beilby, Chippendale (AU); John Zakos, Ashmore (AU)

(73) Assignee: MyCyberTwin Group Pty Ltd, Chippendale, New South Wales (AU)

( * ) Notice: Subject to any disclaimer, the term of this patent is extended or adjusted under 35 U.S.C. 154(b) by 585 days.

(21) Appl. No.: 12/306,563

(22) PCT Filed: Jun. 29, 2007

(86) PCT No.: PCT/AU2007/000912
§ 371 (c)(1),
(2), (4) Date: Feb. 2, 2009

(87) PCT Pub. No.: WO2008/000044
PCT Pub. Date: Jan. 3, 2008

(65) Prior Publication Data
US 2009/0254417 A1    Oct. 8, 2009

Related U.S. Application Data

(60) Provisional application No. 60/830,502, filed on Jul. 13, 2006.

(30) Foreign Application Priority Data

Jun. 29, 2006    (AU) .............................. 2006903497

(51) Int. Cl.
*G06F 17/00*    (2006.01)
*G06N 5/00*    (2006.01)
(52) U.S. Cl.
USPC .......................................................... 706/45
(58) Field of Classification Search
USPC .......................................................... 706/45
See application file for complete search history.

(56) References Cited

U.S. PATENT DOCUMENTS 6,570,555 B1 *    5/2003    Prevost et al. ................. 345/156
8,630,961 B2    1/2014    Beilby et al.
(Continued)

FOREIGN PATENT DOCUMENTS

AU    2007/0264420    6/2007
AU    2009335623    2/2012
(Continued)

OTHER PUBLICATIONS

Int'l Search Rep.
(Continued)

*Primary Examiner* — Kakali Chaki
*Assistant Examiner* — Ababacar Seck
(74) *Attorney, Agent, or Firm* — Berkeley Law & Technology Group, LLP

(57) ABSTRACT

The invention concerns cyberpersonalities, including their and varied use in artificial reality. A cyberpersonality is comprised of a base personality (12). The base personality (12) is selected from a set of base personalities, each one representing the personality of a theoretical person. The cyberpersonality also includes a dynamic personality (14) that reflects the actual person (real or company) that the cyberpersonality is meant to represent and is able to learn. Information contained in the base (12) and dynamic (14) personality can be used to allow the person that the cyberpersonality mimics to interact in the artificial reality without direct control. The cybersonality can chat with third parties, including asking questions and answering questions, so as to learn more about each other. Other uses are related to searching, advertising and direct marketing.

32 Claims, 7 Drawing Sheets

(56) References Cited

U.S. PATENT DOCUMENTS

| | | | |
|---|---|---|---|
| 2002/0133347 | A1 | 9/2002 | Schoneburg et al. |
| 2003/0046689 | A1* | 3/2003 | Gaos .......................... 725/34 |
| 2004/0210661 | A1 | 10/2004 | Thompson |
| 2005/0015350 | A1* | 1/2005 | Foderaro .................... 706/20 |
| 2006/0069546 | A1* | 3/2006 | Rosser et al. .................. 704/9 |
| 2006/0155765 | A1* | 7/2006 | Takeuchi et al. ......... 707/104.1 |
| 2007/0203693 | A1* | 8/2007 | Estes .............................. 704/9 |

FOREIGN PATENT DOCUMENTS

| | | |
|---|---|---|
| WO | WO2008/000044 | 1/2008 |
| WO | WO2008/000046 | 1/2008 |
| WO | PCT/AU2009/000023 | 3/2009 |
| WO | WO2010/078614 | 7/2010 |

OTHER PUBLICATIONS

Int'l Prel. Rep. on Pat'y.

Wr. Op'n of Sch. Auth'y.

The Personality Forge, "The Source for Artificial Intelligence Chat Bots," Jun. 15, 2006 (URL: http://web.archive.org/web/20060615224514/http://www.personalityforge.com/; printed Aug. 16, 2007).

A.L.I.C.E. Artificial Intelligence Foundation, "Superbot—The Easy Way to Create Your Own Custom Bot," May 31, 2006 (URL: http://web.archive.org/web/20060531201617/http://www.alicebot.org/superbot.html; printed Aug. 16, 2007).

jabberwacky.com, "Your Bot—your personality—your character," Jun. 15, 2006 (URL: http://web.archive.org/web/20060615042857/http://www.jabberwacky.com/yourbot; printed Aug. 16, 2007).

Asimov Software, "The Asimov Site," Apr. 18, 2004 (URL: http://web.archive.org/web/20050418222133/www.sondergaard.clara.co.uk/; printed Aug. 16, 2007).

Vilhjalmsson, et al., "BodyChat: Autonomous Communicative Behaviors in Avatars," 1988. In Proceedings of the 2nd Annual ACM Int'l Conference on Autonomous Agents, Minneapolis, 1988 (URL: http://www.media.mit.edu/gnl/publications/agents98.pdf).

SitePal, "AI Knowledge Base," Apr. 27, 2006 (URL: http://web.archive.org/web/20060427051406/http://www.oddcast.com/sitepal/ai; printed Aug. 15, 2007).

Almeida, et al., "Interactive Conversational Characters as a Virtual Tour Guide to an Online Museum Exhibition," 2002. In Proceedings of the Int'l Conference on Computers in Education, 2002. (URL: http://csdl2.computer.org/comp/proceedings/icce/2002/1509/00/15090215.pdf).

Saygin, et al., "Turing Test: 50 Years Later," 2001, Minds and Machines 10: 463-518, 2000 (URL: http://crl.ucsd.edu/~saygin/papers/MMTT.pdf).

Buttazzo, "Artificial Consciousness: Utopia or Real Possibility?", 2001 (URL: http://www.das.ufsc.br/~rabelo/Ensino/DAS6607/Artigos-Gerais/ArtificialConsciousness.pdf).

Graesser, et al., "Intelligent Tutoring Systems with Conversational Dialogue," 2001. In American Assoc. for Artificial Intelligence, Winter 2001 (URL: http://www.info2.uqam.ca/~nkambou/DIC9340/seances/seance2-3-4-6/Tutoring%20inteaction/AIMag22-04-005.pdf).

F. Abbattista, et al. "Improving the usability of an e-commerce web site through personalization." Proceedings of the Workshop on Recommendation and Personalization in Electroinic Commerce, $2^{nd}$ Int. Conference (2002).

B.A. Shawar and E. Atwell. "Chatbots: Are They Really Useful?" LDV-Forum 2007—Band 22(1), p. 29-49 (2007).

B. Chantarotwong. "The Learing Chatbot." Berkely IMS-256 Final Project, 6 pgs. http://courses.ischoool. Berkely.edu (Fall 2006).

Accessing an Information System by Chatting Bayan Abu Shawar and Eric Atwell, School of Computing, University of Leeds, LS2 9JT, Leeds, UK (bshawar, eric)@comp.leeds.ac.uk http://www.comp.leeds.ac.uk.eric/demo.html.

U.S. Appl. No. 13/143,887, filed Jul. 8, 2011, 213 pages.

U.S. Appl. No. 13/143,887; Notice of DO/EO missing requirements, mailed Jul. 25, 2011, 2 pages.

U.S. Appl. No. 13/143,887; Applicant response to notice of DO/EO missing requirements, mailed Oct. 25, 2011, 18 pages.

U.S. Appl. No. 13/143,887; Notice of acceptance of DO/EO mailed Nov. 9, 2011, 6 pages.

U.S. Appl. No. 13/143,887; Notice of publication, mailed Feb. 16, 2012, 1 page.

U.S. Appl. No. 13/143,887; Petition to make special, mailed Mar. 26, 2013, 16 pages.

U.S. Appl. No. 13/143,887; Decision on petition to make special mailed Jun. 4, 2012, 2 pages.

U.S. Appl. No. 13/143,887; Non-Final rejection, mailed Jul. 18, 2012, 25 pages.

U.S. Appl. No. 13/143,887; Amendment, mailed Oct. 17, 2012, 19 pages.

U.S. Appl. No. 13/143,887; Final Rejection, mailed Feb. 4, 2013, 30 pages.

U.S. Appl. No. 13/143,887; RCE, mailed Aug. 2, 2013, 30 pages.

U.S. Appl. No. 13/143,887; Notice of allowance and fees due, mailed Aug. 27, 2013, 19 pages.

PCT/WO2010/078614: Application as filed on Jan. 8, 2009, 64 pages.

PCT/WO2010/078614: International search report, mailed Mar. 24, 2009, 7 pages.

PCT/WO2010/078614: International Preliminary Report on Patentability, mailed Feb. 27, 2011, 54 pages.

PCT/WO2010/078614: Written opinion of the International Search Authority, mailed Mar. 17, 2009, 7 pages.

PCT/WO2008/000044: Application as filed on Jul. 13, 2006, 48 pages.

PCT/WO2008/000044: Initial publication with ISR, published Jan. 3, 2008, 60 pages.

PCT/WO2008/000044: International Preliminary Report on Patentability, mailed May 12, 2008, 4 pages.

PCT/WO2008/000044: Written opinion of the International Search Authority, mailed Sep. 3, 2007, 5 pages.

U.S. Appl. No. 13/143,887; Misc Communication to applicant, mailed Sep. 17, 2013, 1 page.

U.S. Appl. No. 13/143,887; Issue fee payment and amendment after allowance, mailed Nov. 27, 2013, 18 pages.

* cited by examiner

|        | mother | father | family | sport | ............x |
|--------|--------|--------|--------|-------|---------------|
| mother | 0      | 1      | 1      | 0     | ............. |
| father | 1      | 0      | 1      | 1     | ............. |
| family | 1      | 1      | 0      | 0     | ............. |
| sport  | 0      | 1      | 0      | 1     | ............. |

TERM MATRIX

|  | My work | work is | is fine | my | work | is | fine | ........x |
|---|---|---|---|---|---|---|---|---|
| How is | 1 | 1 | 1 | 4 | 1 | 3 | 1 | |
| is your | 1 | 1 | 1 | 5 | 1 | 3 | 1 | |
| your work | 1 | 1 | 1 | 1 | 1 | 1 | 1 | |
| how | 1 | 1 | 1 | 6 | 1 | 5 | 1 | |
| is | 1 | 1 | 1 | 1 | 1 | 1 | 1 | |
| your | 1 | 1 | 1 | 17 | 1 | 9 | 1 | |

KNOWLEDGE MATRIX

CYBERPERSONALITIES IN ARTIFICIAL REALITY

CROSS REFERENCE TO RELATED APPLICATIONS

The present application is a national phase filing under 35 U.S.C. §371 of PCT/AU2007/000912. That application is based on and claims priority to Australian application 2006903497 filed Jun. 26, 2006, and U.S. application 60/830,502 filed Jul. 13, 2006. The entire contents of all three applications are incorporated herein by reference.

TECHNICAL FIELD

This invention concerns Cyberpersonalities in artificial reality, such as on the Internet. Different aspects of the invention include the creation of artificial Cyberpersonalities and a variety of uses. In particular this invention concerns the creation of artificial personalities that have characteristics of the creator and these are termed "Cybertwins". Such Cyberpersonalities may be used to represent natural or corporate persons on-line, and to communicate with third parties as a substitute for their creator. The personalities may also be embedded in avatars.

BACKGROUND ART

It is commonplace to see avatars in video gaming. Typically it is possible to select an avatar to represent each player. Selection generally takes place after viewing pictures and personality profiles of the avatars. The available selection might contain a number of personality stereotypes, for instance: There may be a young, cute, ruthless and intelligent girl; a big, strong, dumb man; or a skinny but wily soy. The avatar will move and provide sound effects such as grunts and simple expressions in keeping with its stereotype. Alternatively, gaming avatars may exhibit characteristics typical of fictional characters, such as James Bond.

In more sophisticated environments, it is possible to create more sophisticated avatars.

DISCLOSURE OF THE INVENTION

This invention is a cyberpersonality for use in artificial reality, comprising:

An artificial base cyberpersonality having a personality profile, representative of a theoretical personality, that has predetermined conversation elements including questions, interjections, and a knowledge base.

A dynamic cyberpersonality created to have user-generated information including conversation elements derived from the communications or activities of a user, who is either a real or corporate person.

Such personalities may be used to represent real or corporate persons in artificial reality, and to communicate with third parties as a substitute for their creator.

The invention may further comprise a cyberpersonality controller that directs communication with the cyberpersonality selectively to the dynamic and base personalities.

A number of different base cyberpersonalities may be created to represent different theoretical personalities, characteristics or types. And one of these may be selected or allocated to a user at the time of creation of the cyberpersonality.

The dynamic personality may store words together with a label indicating their part of speech, responses, and part or all of input response pairs. The dynamic personality uses this store of knowledge to generate responses for use in conversation with users.

A dynamic cyberpersonality may be developed by a user to create a cybertwin cyberpersonality that mimics the user who created them. In this case the user-generated information may include any matter generated by the user, either directly as written matter or conversation, or indirectly from other recorded activity, or by inference.

Alternatively, the cyberpersonalities may mimic desired personality traits.

A cyberpersonality may be embedded in a chatbot, avatar or virtual manifestation of a company.

A cyberpersonality may be used to gather information about a user; it could be the cyberpersonality's user or another user.

The cyberpersonality may gather information about its own user to develop the dynamic cyberpersonality. Alternatively, it might gather information about its own user for profiling, generating psychographic and situation-specific user characteristics, market segment membership, group membership including virtual or multi-media clusters, or current user interests.

The information may be used to apply behaviours to the embedded cyberpersonality including styles of speech or aspects of appearance.

The information may be used to create virtual characteristics in a video, music, gaming, shopping, work or other multimedia environment the user may select.

The information may be used to select relevant search results, media content or advertising for the user to see.

The cyberpersonality might use this information to match its own user with another user or to a group. The information may be used to enable the cyberpersonality to find information, products and other people for its own user. For instance it may converse with a dating or career portal on behalf of its user.

The information may be gathered directly via the answers to questions, or indirectly by analysis of language, or by identifying a grouping the user might belong to and inferring information about the group to be true for the user. Indirect analysis make take account of information generated by the user while engaged in other activities besides conversation with the cyberpersonality. In any event the information may be combined with a weighting.

Language analysis may involve semantic analysis of the words used by a user, or analysis of style elements used by a user.

A group may be identified by having similar demographics or personality traits or belonging to the same market sector as a user.

A cyberpersonality may be used to gather information about another user, that is a "visitor" who converses with the cyberpersonality in artificial reality. The information may be used for profiling the visitor, or for generating psychographic and situation-specific user characteristics, market segment membership, group membership including virtual or multi-media clusters, or the visitor's interests. This enables a cyberpersonality to be used to allocate the base cyberpersonality for a new user wishing to create a cyberpersonality.

The information may be used to match the visitor with another user or to a group on a fee for service basis. For instance, the information may be used to enable a cyberpersonality to find information, products and other people for the visitor.

The cyberpersonality, especially when embedded in a chatbot or virtual avatar, may be presented as the public face of a dating or career portal for online dating, or job or career searching. It may also be used to deliver advertising content. The advertising could appear in the avatar's conversation or appearance or incidentally with it. Advertising content could be selected for delivery according to any information generated or received by the avatar. The cyberpersonality may also be used for market research.

In another aspect the invention is a method for creating a cyberpersonality, comprising the steps of:

Creating a number of artificial base cyberpersonalities each having a different personality profile, representative of a different theoretical person.

Creating a psychographic profile of a user.

Allocating to the user the artificial base cyberpersonality that best matches the user's psychographic profile.

Creating a dynamic cyberpersonality created to have conversation elements derived from the communications or activities of a real or corporate person.

The method might also include one or more of the following steps:

Developing the dynamic cyberpersonality during its use by the user.

Controlling interactions with the cyberpersonality by preferring to direct interactions to the dynamic cyberpersonality rather than the base cyberpersonality.

In a further aspect the invention is a downloadable consumer software application that enables users to create a cyberpersonality using the method.

In a further aspect the invention is a method for operating a computer interface, comprising the steps of:

Arranging the computer interface to direct incoming communications from third parties to a cyberpersonality.

Directing the communications preferentially to the dynamic cyberpersonality for reply and in the event the dynamic personality is unable to reply, then directing the communications to the base cyberpersonality for reply.

BRIEF DESCRIPTION OF THE DRAWINGS

Examples of the invention will now be described with reference to the accompanying drawings, in which:

FIG. 5 is a diagram of a term matrix.

FIG. 6 is a diagram of a knowledge matrix.

BEST MODE OF THE INVENTION

Figure 1:
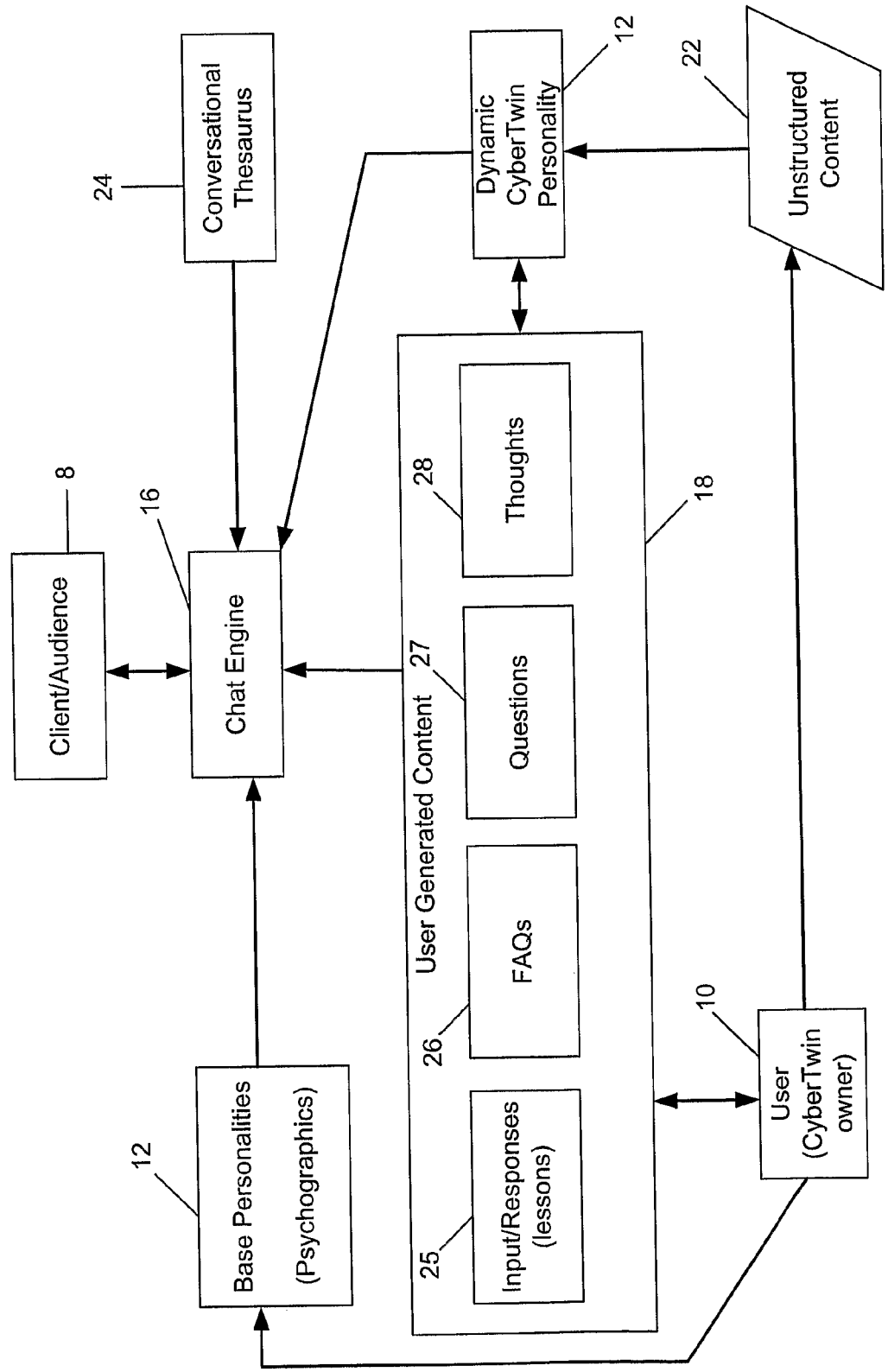
FIG. 1 is a schematic diagram illustrating the Cybertwin software architecture.

Referring now to FIG. 1, a Cybertwin is a user-generated artificially intelligent software personality that automatically replicates the way the user 10 thinks, acts and chats. A Cybertwin lives online as a personalised virtual character that is representative of the user 10, and may be put to use in artificial reality as a substitute communications agent. The user may be a natural person or a corporation.

Clients or audience 8 of the Cybertwin access the URL of the given Cybertwin. When accessing a particular Cybertwin, a client 8 is requested to submit a user name and password so that the Cybertwin can identify who they are. This gives the Cybertwin the ability to customise its responses for that particular client 8. This model ensures privacy and individualised control over Cybertwin conversations.

Figure 3:
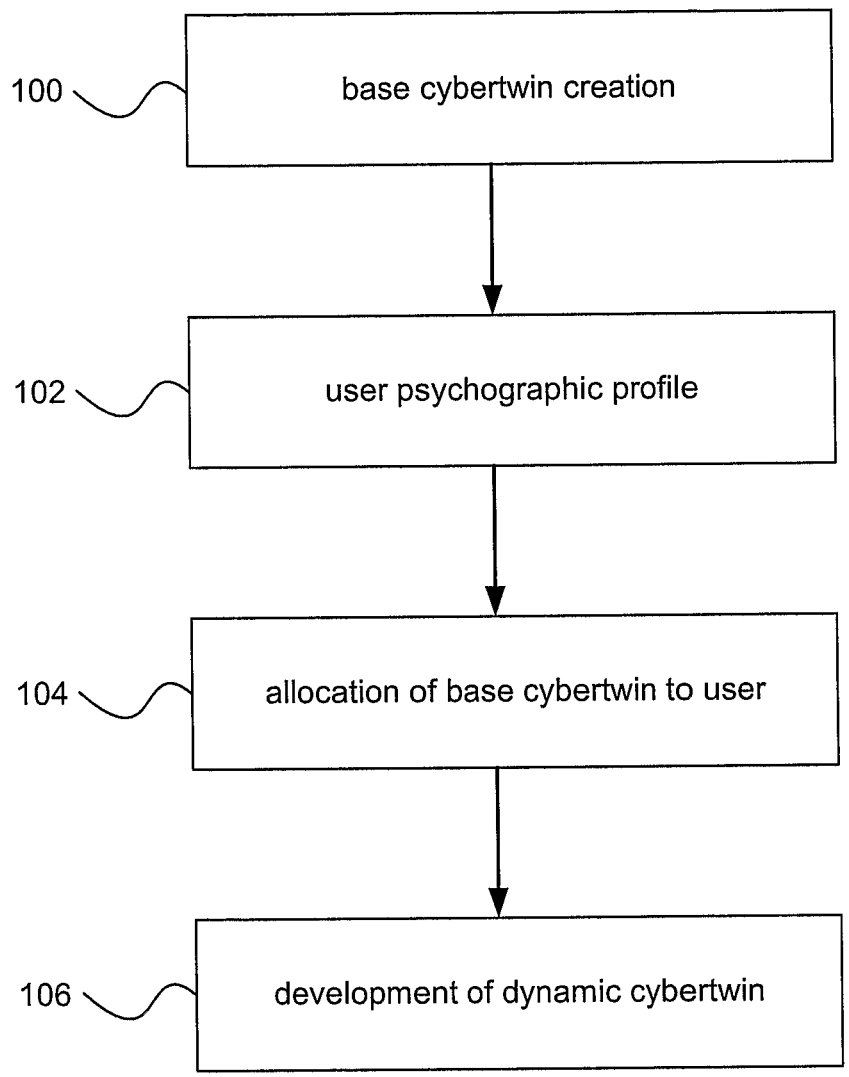
FIG. 3 is a flowchart showing Cybertwin creation.

A Cybertwin is made from two components, namely a Base Cybertwin Personality 12 and a Dynamic Cybertwin Personality 14 that operate under the control of a Chat Engine 16. The process for creating a Cybertwin is illustrated in FIG. 3 and this will be referred to in the following sections as appropriate.

The Base Cybertwin Personality 12 is formed from user-generated content to model various personality types. This forms the knowledge base of any new Cybertwin that is created.

The Dynamic Cybertwin Personality 14 is formed from user-generated content which has been either manually entered directly by the user 18 or gathered indirectly via dynamic extraction algorithms applied to unstructured user content 22. User-generated content 18 is used by the Chat Engine 16 to provide a compelling chat experience.

In addition to the Base Cybertwin Personalities 12, the Dynamic Cybertwin Personality 14 and the Chat Engine 16 which controls the Cybertwins' chats, there is the Conversation Thesaurus 24.

The Cyberpersonality, including the knowledge base is stored on a datastore associated with a server. The server has software installed to control the server's processor to provide an interface, such as the Cybertwin chatbox. The server is connected to the Internet. The user 8 is able to connect to the server using the Internet in order to provide content and to use the interface, such as to perform searches that use the Cyberpersonality detail in the search. A client 10 is able to access the server using the Internet to presented with an interface that is based on the Cyberpersonality, such as to communicate with the cyberpersonality.

The invention will now be described in more detail.

The Base Cybertwin Personalities 12

A Base Cybertwin Personality 12 is a static virtual personality that is representative of a certain type of person. There can be any number of Base Cybertwin Personalities 12. Each Base Cybertwin Personality 21 is carefully created so that it reflects the intended personality accurately. This creation step is shown at 100 of FIG. 3. This entails determining how a particular Base Cybertwin Personality 12 should respond to a particular questions or statement.

Figure 2:
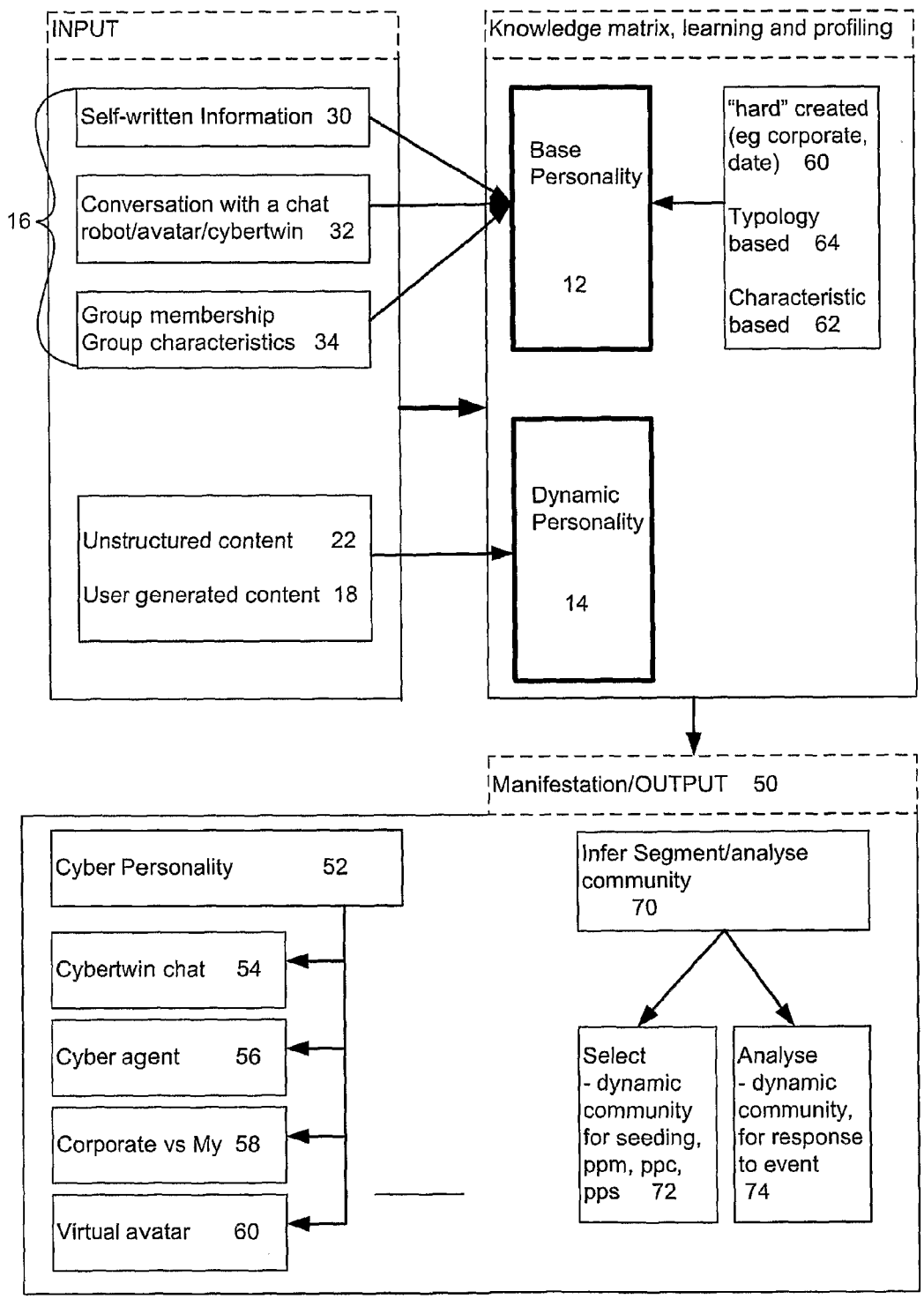
FIG. 2 is a block diagram illustrating the dynamic extraction and creation processes.

There are several approaches available for creating Base Cybertwin Personalities and these are shown schematically in FIG. 2, namely "hard" creation approach 60, Typology based approach 64 and Characteristic approach 62. Each of these approaches will now be described.

"Hard" Creation Approach 60

The Base Cybertwin Personality is manually created, by modelling it directly from an 'ideal' human or corporate model. This is useful for creating Cybertwins in an environment where a lot of information is available. It is also desirable when a known, relatively predictable Cybertwin is required.

Using this approach Base Cybertwin Personality profiles are created by human conversational content creators using proprietary content editing and knowledge generation interfaces. The content creators generate hundreds or even thousands lines of content for each base personality that is representative of a personality type.

For example the elements of a Base Cybertwin cyberpsychologist's conversation consist of:

Profiling questions designed to score against a particular psychographic characteristic. For example the cyberpsychologist base personality asks: "do you often buy things on an impulse." Responses of "yes" or "yeah, always" give a score towards high impulsivity. A response of "maybe" give a zero score against the characteristic. A response of "no" gives a negative score.

Interjections or short phrases, to supplement a sentence, like "hmm".

Generic comments designed to be applicable in almost any context. They are used when the Cybertwin does not know the correct response in a conversation.

Leading questions designed to lead the visitor into conversation, for instance "what do you think love is?" The usually lead to a free-form answer from the visitor to the Cybertwin.

A knowledge base, that is the body of content that allows the Cybertwin to give a 'known' response. So if the visitor says "what do you think love is?" and the Cybertwin has a definition of love in it's content knowledge base, it is able to give a known answer.

The ratio of comments to questions.

A web-based user interface is used to input the conversation elements, and also during use of the Cybertwin to profile interlocutors to score the answers to profiling questions.

Characteristic-Based Creation 62

A base personality can be seen as given set of characteristics, present in a particular proportion, and expressed in a certain situation. Each individual presents certain characteristics in a situation. These may be source characteristics, superficial ones, and outward manifestations of these. A number of individuals may represent a similar set of characteristics, of similar strength, and in similar proportions.

The underlying characteristics that differentiate one user from another, or one characteristic of a group from another, are as follows:

Values and attitudes
Personality traits
Emotional styles, Attachment styles
Topics of interest
Conceptual map/s
Demographic segmentation
Age
Gender
Industry
Technology usage—technophobic versus digital native (length of time on broadband or IM, music download experience etc).

Types of Characteristics

Characteristics can either be source (or intrinsic) characteristics, that is predictive of behaviour, or of other characterstics, or of group membership; or superficial characteristics which are not predictive, and usually not stable. They are usually merely a manifestation of underlying characteristics, and are not causative in themselves. Either type may be expressed directly by the user, or may be inferred from a combination of other expressed characteristics.

An example of direct expression would be the user saying "love downloading music".

An example of an inferred characteristic, would be a user spending a lot of time talking to friends about music, and visiting sites with downloadable music.

Another example of direct expression would be a user saying "I am 25 years old" as an expression of a demographic characteristic. This same characteristic could be inferred if the user often uses slang words common to the Y-generation, and talks about college or university.

Base personality characteristics can be observed broadly in two different ways:

Differences in communication output.
Differences in intrinsic characteristics.

Measurement of Components or Characteristics

These are measured using:
Directs questions to users.
User expression, by what they write on the web, what they read, what they do, who they mix with.
Membership in a group which expresses characteristics such as term descriptors.

Specific Examples of Measurement Instruments

Values and attitudes may be measured using instruments like the value inventories created by Rokeach and Ball-Rocheach, or Sauciers domain model.

Personality Traits may be measured using inventories such as broad band inventories, or single constructs, deemed to be a relevant characteristic in a given situation.

Emotional styles and attachment styles may be measured using techniques described by Gross and John (1998), or Brennan Clark and Shavers (1998).

These instruments have been found to be useful for generating Cybertwins for instant messaging (IM), which has text conversation output with a user in an IM environment.

Some examples of characteristics relevant for a particular situation include impulsivity, agreeableness, group versus self orientation and cognitive style especially effortful thinking (Need for Cognition—NFC).

Other variables may be scored for virtual avatars that are being given Cybertwin conversation data and 'personality'. For example, emotional stability may be an important distinguishing characteristic determining output style of a virtual avatar in a gaming environment. Intellectual curiosity (which maps to interest in art) may be an important differentiator for a Cybertwin living in a multimedia or video environment.

Demographics may be gathered directly from a company hosting blogs or other content, or the internet portal managing it, or from the user. They may be adapted to commercial consumer value and lifestyle systems like the VALs market segmentation system.

Typology-Based Creation Approach 64

Typologies are simplified ways of grouping humans. Typologies are most useful when we have limited information. A number of base 'typologies' are created for a given situation. The user is then assigned to a typology, and given the input and output features of that typology. Nevertheless the base personality (and the dynamic personality) will be modified according to characteristics.

For example, in a youth social networking portal, like MySpace, or yahoo!360, or Google orkut, the following typologies may be created:

Type X—Y Generation, Technophile, Aggressive Online Gamer
  Demographics including age, and high use of technology.
  Personality is impulsive, low agreeable, low intellectual or effortful thinker.
  Topics would include gaming, internet, sexual innuendo.
Type Y—Teenage, Female Chatterbox
  Demographic, under 19, female
  Personality, highly agreeable and sociable, low independence, impulsivity.
  Topics would include celebrities, boys, social events.

The base Cybertwins are ready to chat and respond to input from the time they are installed. The dynamic Cybertwin 14 is created from the conversations the base Cybertwin has with the user.

A user wishing to create a Cybertwin will be allocated to a base Cybertwin which will be able to chat and provide responses while a Dyamic Cybertwin learns about the user from their input and activities.

User Profiling 102 and Base Cybertwin Personality Assignment 104

A user 10 intending to become a Cybertwin owner must be assigned to a Base Cybertwin Personality 12. To make this assignment the user 10 is first psychographically profiled by collecting user information; see FIG. 3 item 102. This may be collected from information written by the user 30, information derived during conversations with the user and a chat robot 32, or from group memberships 34.

The psychographic profile comprises a vector representing psychographic characteristics; each vector has an integer value. Each question that is asked contributes to either a decrement or increment of an element value in the profile vector. The resultant vector consists of a number of psychographic characteristics, such as:

The following is a list of some of the psychographic characteristics included in the psychographic-based profiles; it includes descriptive euphemisms for the high (or strong) and low (or weak) associations to each characteristic:

| Characteristic | High | Low |
| --- | --- | --- |
| Attractiveness (self-rated) | very attractive | great personality |
| Life path-relationship | long term relationship | fun relationships |
| Life path-kids: have | have kids | no kids please |
| Life path-kids; want | want kids | don't want kids |
| VA alpha-religiosity | traditional values | self-directed authority |
| VA beta-self vs. group | self enhancement | altruistic group enhancement |
| VA delta-spiritual individual | spiritual individualism | realist |
| VA Work achievement | achiever | easygoing |
| P Openness intellect | intellectual curiosity | down-to-earth |
| P Agreeableness | warm hearted | tough |
| P Attachment-avoidance | close cuddler | cool |
| P Attachment-stability/anxiety | relaxed | reactive |
| P Disinhibition | impulsive | self-disciplined |
| P Locus of control (LOC) | goal directed | social group focus |
| P Narcissism | politically capable | gentle and non-vain |

The profile of each Base Cybertwin Personality is then compared with the user-generated profile to determine which Base Cybertwin Personality is most like the user. The closest matching Base Cybertwin Personality is selected; see FIG. 3 item 104.

For example, in the situation of attraction between one human and another, and specifically in a formal online dating environment, the characteristics that would be most useful to a Base Cybertwin Personality are:

Self rated attractiveness.
Life course attributes.
Values and attitudes, such as traditionalism.
Values and attitudes, such as spirituality and altruism.
Personality, for instance goal directedness.
Personality and cognitive style, for example intellectual openness.
Personality: agreeableness.
Personality: neuroticism/stability.
Personality: impulsivity and conscientiousness.

A user seeking to date will engage in chat with the Cybertwin and that user's responses will be recorded using profiling questions. The term-descriptor approach is then applied to the user-generated content. The user will then be scored in these characteristics. In the dating application, similarity in these variables is a good indicator of attraction, so the user would be matched with other users who had a similar profile.

Alternatively, using factor analysis, and identifying strong predictive patterns of underlying characteristics, it is possible to formulate large numbers of groups, and identify user preferences, as well as the sort of people a user would like to contact.

The Dynamic Cybertwin Personality 14

Once the Base Cybertwin Personality 12 has been allocated to a user 10 the task of developing the Dynamic Cybertwin Personality can begin; see FIG. 3 item 106. The aim is to create a real and accurate duplication of the user 10. The Dynamic Cybertwin Personality 14 learns from the user-generated content which has been either manually entered 18 or automatically extracted by the dynamic extraction algorithm from unstructured content 22. There is nothing that is pre-constructed about the Dynamic Cybertwin Personality. It starts with zero personality and zero knowledge from day one. It is designed to learn as much as possible from content the user 10 has written and from other activities they have performed online.

The more good-quality content descriptive of the Cybertwin owner 10 that is captured, the smarter, more intelligent and compelling the dynamic Cybertwin will be.

Content can be any text that the Cybertwin owner 10 has written. Content needs to provide a good indication as to both the writing style and thoughts of the Cybertwin owner 10. Suitable content is available from instant messaging or online chat conversational history, emails and blogs. These forms of content provide clear first person expressive text. The Cybertwin will attempt to mimic its owner by providing a combination of the expressions uttered by the owner in response to an interlocutor.

Other suitable type of content that can be provided as input is email messages and blogs. These are also good types of content since they are written in first person by the owner of the Cybertwin and are usually expressive of a variety of thoughts, ideas and opinions.

Manually Entered User-Generated Content 18

A user 10 can enter content directly into the knowledge structures of a Cybertwin. This allows the user to manually train her/his Cybertwin.

The Cybertwin stores different types of user-generated content, namely: Input/Responses (lessons) 25, FAQs 26, Questions 27, Thoughts 28, and the Dynamic Knowledge Base. Input/Responses (lessons) 25, FAQs 26, Questions 27 and Thoughts 28 can be entered manually by the user 10 or extracted from unstructured user-generated content 22 by the dynamic extraction algorithm.

Input/Responses (Lessons) 25

This stores content according to input and response pairs and is gathered from the user 10 via a lesson approach. A user 10 would typically be prompted to respond to various prompts (input) and the user's responses are accepted and stored as the response for that. For example, a user may be asked to enter how they would response to the input "How are you?" The user 10 may response with something like "I am well" or "Not bad thanks". So, if the user 10 is prompted to respond to many different types of statements, a long list of input/response pairs can be generated and used by the chat engine 16 for chat.

FAQs 26

These are frequently asked questions (input) and answers (responses) given by the user 10.

Questions 27

These are questions the user 10 wants to ask the audience 8. Answers to these questions can be stored via the chat engine 16 so that the user 10 can view them at a later date.

Thoughts 28

These are general thoughts, remarks and statements that the user 10 wants to share with the audience 8.

Dynamic Knowledge Base

This stores special knowledge structures and formats that are extracted by the dynamic extraction algorithm applied to unstructured user-generated content 22.

Conversation with Another Cybertwin

A conversation with a properly trained Cybertwin will elicit the user's natural responses, and these are then recorded for their Cybertwin to use in appropriate circumstances.

Feedback

The user may also be asked to let friends 'test' an early version of their Cybertwin, and give feedback on how much like the owner the Cybertwin responses are. Again information input is weighted according to how close to original user output it is.

Unstructured User-Generated Content for Automatic Extraction 22

Unstructured user-generated content is also used to create the dynamic Cybertwin personality 14.

Conversation History

Conversation data created in the process of the user having a conversation with another person, for instance by instant messaging, email or by telephone conversations converted to text.

Web-based information identified as being important to the user, or in alignment with their interests or knowledge; including:
  Websites (urls).
  Links to other websites.
  Browsing history.
  Topics of interest and language style identified from, or similar to, user-written information or links.
  Pre-indexed topic-oriented content, examples might be entertainment, internet technology, finance or video games, and these may be selected by the user from a list, and possibly ranked by importance in the user's knowledge base, for instance as "no interest, mild interest, basic knowledge, good knowledge, or expert".

In general information input is weighted according to how close to original user output it is, and used accordingly. So for example material written by the user is weighted more highly than text from a website indicated by the user to be important. This is turn is weighted more highly that websites the user has merely visited. Similarly chat conversation with another user is weighted more than random conversation.

Information about the activities undertaken online by the user is also used as input. For example, the user may visit music sites, and spend a lot of time in online virtual gaming environments. Alternatively, a user may only use the internet for banking.

Information about the modalities of use is also used. For example:
  Reading websites
  Using search engines
  Transacting online
  Using online communication technology, like chatrooms instant messaging or video conferencing
  Using immersive media, like online gaming, virtual worlds and virtual reality.

Group Allocation

A user manifests a certain pattern of characteristics in a given situation, and these are analysed for their similarity to characteristics of known or pre-identified groups. When a sufficient degree of similarity is established the user is 'assigned' to that group. As a result, a body of input common to the group is automatically applied to the Cybertwin any member of that group decides to create. The content may be modified for a member who has one or two characteristics uncommon in the group. A group or community is not a static group of humans, but a dynamic grouping, based on a common pattern of underlying characteristics of a number of individuals, which manifest in a particular situation.

Groups are formulated on the basis of two approaches, namely Factor Analysis and Term Descriptors.

Factor Analysis

Factor analysis is a statistical method of determining the underlying concepts (factors) associated with a particular group of data. It works in a high dimensional space, where many items can be represented by large vectors. If the aggregated data is represented by a matrix, where each element in the matrix represents the correlation between two elements, the inter-correlations between all elements can be calculated and stored in an inter-correlation matrix. A mathematical process to rotate this matrix can be performed to group elements on the data that have strong interdependencies between them. These groups are the factors or underlying concepts of the data. One groups have been formed, factor loading can determine to what degree each element influences the factor it is grouped to. Each group can be labelled and that name can be considered the representative of the group.

Factor analysis can be used to predict behaviour. For example, where it is possible to measure a number of behaviours (elements) of a certain individual (item) then it is possible to ascertain close approximations of the measurements of behaviours that are not measured by calculating which group the known measurements belong to and then using the groups measurements for the unknown behaviours as predictions for those behaviours.

Cattell's factor analysis approach can also be used. Briefly, this is based on the theory that surface traits, the building blocks on personalities, can be rotated onto simple explainable structures. By using a large number of personality traits/variables, Cattell was able to show how these could be correlated into a smaller number of identifiable groups through factor analysis to better explain the dynamics of personality.

Term Descriptors

This approach will be described by way of an example:

First a sample group is selected. Then a strong representative of a particular characteristic, or market segment is selected. The commonality is then analysed by a human researcher to identify the 'term descriptors' In particular, the human researcher will read input from the users in the group and extract words, descriptions, style and representational indicators which indicate, to the human mind, the underlying characteristics. For example, friendly people who use instant messaging might use the instant messaging slang for 'laugh out loud' "LOL" and this would therefore be a 'term descriptor' for the characteristic 'friendly person who uses instant messaging.'

In addition, a semi-automatic method of word extraction can be used by which indicators are then used as 'search phrases' for large scale data mining of user input for the group. The term descriptors may then be refined by weighting them according to their TFxIDF weight, and then ranking them in descending order. These new terms/indicators may then be edited manually and added to a human researched list.

The manual and automatic processes can be repeated a number of times until the list of indicators is both large and accurate. The representative indicators or term descriptors can include:

Self description, such as common words, especially adjectives, language relative to the norm or colloquialisms.

An example in dating would be the person describing themselves as "love new experience, good conversation," as indicative of intellectual openness.

Manifestation style, that is how the user chooses to present themselves, for instance using a photograph or not.

Browsing history, which might identify characteristics of other members they have been attracted to, or interacted with strongly.

Dynamic Cybertwin Architecture

Figure 4:
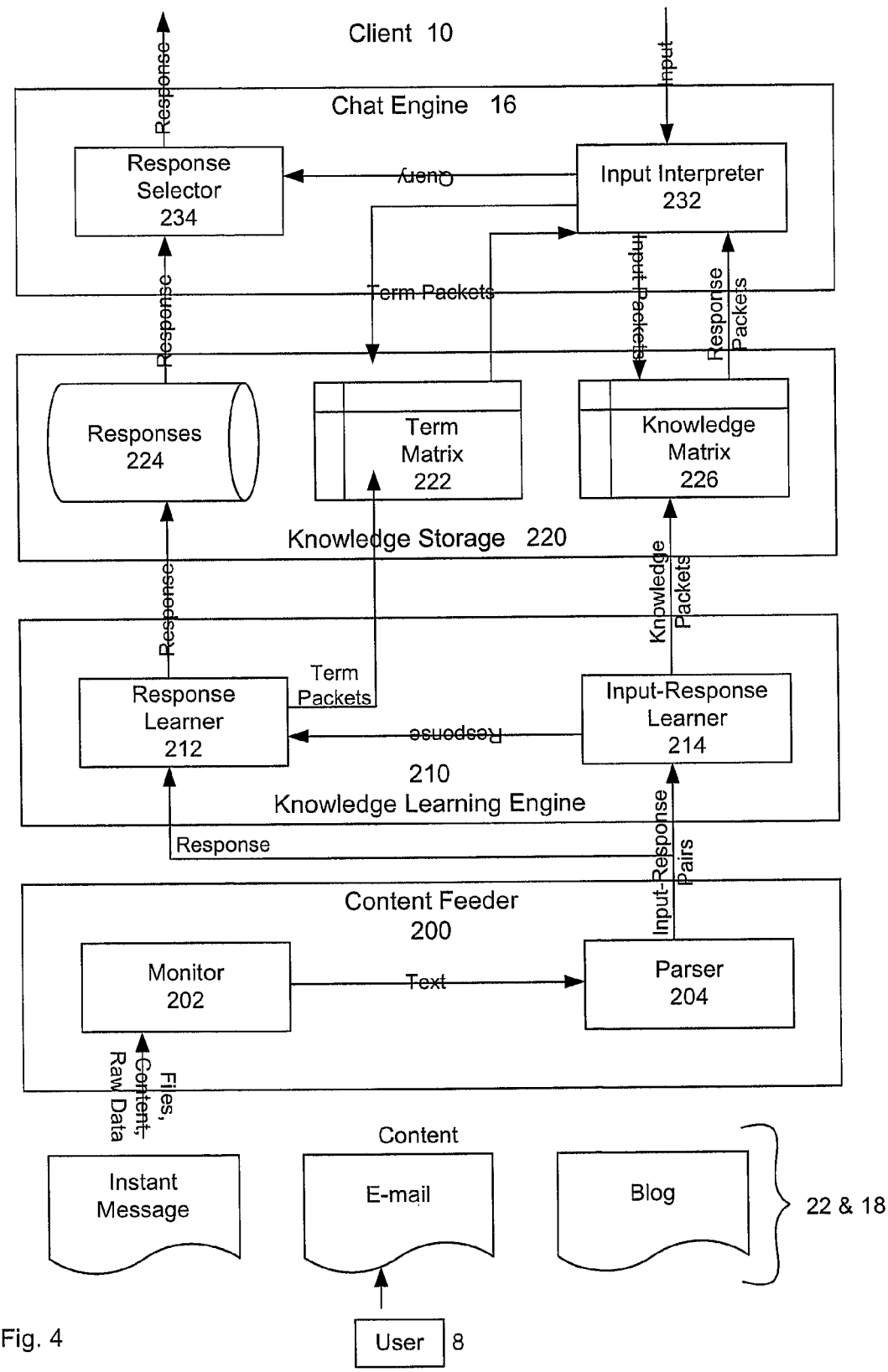
FIG. 4 is a block diagram of a dynamically-created Cybertwin.

The aim of the Cybertwin architecture is to provide a technology platform that allows for the automatic creation and use of Cybertwins on the Internet. Referring now to FIG. 4 the components of the dynamic Cybertwin architecture and their operation will be described.

User input 22 and 18 is continually monitored for new content by the content feeder 200. Once identified it is read and passed on as plain text to the parser 204. The parser accepts the text and converts conversational text into input-response pairs and other text to responses. Input-response pairs and responses are then passed on to the input-response learner 214 and responses learner respectively 212. These learners 214 and 212 are part of the knowledge learning engine 210; its aim is to intelligently interpret the input-response pairs and responses to derive knowledge which ran be stored and used later for chatting. This knowledge represents rich and useful language information about the Cybertwin's owner. That is, what words they use, how they talk and how they think. Knowledge storage is responsible for storing the output out the knowledge learning engine.

The knowledge store 220 comprises a responses database 224, a term matrix 222 and a knowledge matrix 226. Each store different types of knowledge, but collectively provide a powerful and exploitable knowledgebase for Cybertwins. It is the chat engine 16 that uses the knowledge in knowledge store 220 to ultimately provide intelligent chat and a compelling and engaging experience to a user of a Cybertwin.

The dynamic algorithms are also responsible for identifying and extracting input/response pairs 25, FAQs 26, questions 27 and questions 28 that can be placed into the Cybertwin knowledge structures.

The components will now be described in more detail.

Content Feeder 200

The Content Feeder 200 is responsible for obtaining new content that becomes available from the Cybertwin owner 10 and making the content readily available in the appropriate format to the Knowledge Learning Engine 210. The Content Feeder 200 consists of both a Monitor 202 and Parser 204. These are described in the following two sections.

Monitor 202

Content should be saved into a single directory on the local computer of the Cybertwin's owner 10. This directory can then be continuously monitored by the Monitor 202.

The Monitor 202 is a client-side piece of software that is downloaded and installed. Once installed, the user specifies the directory to monitor for new content. When a user 10 has created new content and saved it to the specified directory, the Monitor 202 will automatically detect this, read the new content, and upload the content onto a server using an Internet Connect where the Parser 204 is located.

Parser 204

The Parser 204 accepts the plain text input by the Monitor 202 program and outputs input-response pairs and responses. Its aim is to successfully parse chunks of text firstly into sentence and term tokens and then into input-response pairs for conversational text.

A response is a single sentence. These are taken from blog and emails. But an Input-Response Pair is an input sentence or sentences coupled with a response sentence or sentences from a conversation.

Tee challenges for the parser are to firstly clean the text of any tags or unnecessary formatting information from the text and then to detect sentence and term boundaries. This is done by a standard text parsing type functions.

The parsed text that is output is Input-Response Pairs that are passed to the Input-Response Learner.

Knowledge Learning Engine 210

The Knowledge Leaning Engine 210 is responsible for the conversion of content to be a part of a usable, rich knowledgebase. The Input-Response Learner 214 is responsible for deriving knowledge from conversational history given by input-response pairs that have been output by the Parser. The Response Learner 212, on the other hand, handles single response utterances given by the Parser 204. Both analyse parsed content and store the knowledge outputs within the Knowledge Storage 220.

Response Learner 212

The aim of the Response Learner 212 is to firstly analyse a single response at a time and extract term knowledge from it to store in the term matrix 222, and secondly store the response itself in the Responses Database 224. In the context of the Response Learner 212, term knowledge refers to the extraction of information that contributes to the identification of its related terms, given a particular base term.

The Response Learner 212 first identifies the part of speech for every term in the response. Then, co-occurrence observations between all noun, verb and adjective terms are identified so that the relationship between them can be extracted. The Response Learner 212 is based on the notion that if a particular term occurs in a response with another term, then those two terms are related to each other and can be considered related terms. Extending this founding principle, the more responses those two terms occur together in, then the more related they are.

The Response Learner 212 algorithm learns which terms are related to each other by analysing and extracting knowledge from many responses over time. The algorithm can be described as follows:

```
Assign POS to each term in response R using a POS Tagger
For every term t in R
    If t is a noun, verb or adjective then
        For every term x in R
            If x is a noun, verb or adjective then
                Store the term relationship t,x in the
                term matrix
```

By mining these co-occurrence relationships and storing them in the term matrix 222, a term relationship landscape for a set of responses is developed over time. These term relationships can be used to determined related terms. For example, using the term matrix, it should be possible to determine that the terms 'tyre', 'fuel' and 'drive' are related to the term 'car'

Input Response Learner 214

The aim of the Input Response Learner 214 is to mine data from input-response pairs to derive knowledge packets that can be stored in the knowledge matrix 226. It is this knowledge that ultimately influences what the Cybertwin actually says during a chat.

Conversational data is hugely valuable to the Cybertwin. It is essential informational 'food' which the Input Response Learner 214 intuitively exploits to build its own knowledge in the knowledge matrix. The idea is to extract units of knowledge patterns from an input-response pair and store these in the knowledge matrix 216. The principle behind this is that sub-pattern term data when mined across inputs and responses can give good information as to how to respond to a new input that contains some previously seen sub-patterns during real chat.

Term triplets are used as a basis of determining patterns in inputs and responses. Essentially the Input-Response Learner 214 learns by firstly identifying all triplets in both the input and response and then by identifying and storing triplet pairs (knowledge packets) in the knowledge matrix:

```
Given an input-response pair IRP that consists of an input I
and response R
    Determine all triplets T in I
Determine all triplets D in R
For every triplet t in T
    For every triplet d in D
        Store the knowledge packet t,d in the knowledge matrix
```

The more a particular knowledge packets co-occurs in the same input-response pair, the greater the relatedness between them. The teaming algorithm is best described through a concrete example. Consider the following input response pair:

Input: The dog ran down the road.
Response: Which road was that?
In determining the term triplets T in the input, the following are identified
The dog ran
dog ran down
ran down the
down the road
In determining the triplets D in the response, the following are identified:
Which road was
road was that Now that both sets of triplets have been determined, the relationships between them are mined as knowledge packets (t,d) and stored in the knowledge matrix:

| t | d |
|---|---|
| the dog ran | which road was |
| the dog ran | road was that |
| dog ran down | which road was |
| dog ran down | road was that |
| ran down the | which road was |
| ran down the | road was that |
| down the road | which road was |
| down the road | road was that |

In this particular example, there are eight knowledge packets that are extracted and stored in the knowledge matrix 226. The response part of the input response-pair is passed to the response learner for further learning.

The input-response leaning process can be performed by using longer or shorter term elements. In the standard example, triplets are used. As has been shown, this means three, terms per phrase are used for knowledge packet elements t and d. But the number of elements in a term phrase can vary. It can be as small as one and ideally to larger than about ten. Three seems to be an ideal size, enough to capture short sequences of expressions and combinations of word usage.

Knowledge Storage 220

Knowledge Storage 220 is responsible for storing the responses and the mined knowledge in the term and knowledge matrices. It is a repository of information that is written to by the Knowledge Learning Engine 210 and retrieved and utilised by the Chat Engine 16. The data stores 222, 224 and 226 are a combination of traditional databases and file stores with typical data structures.

Term Matrix 222

The term matrix 222 is a two dimensional matrix where both the x and y columns a representative of terms. Its purpose is to store information on the relationship between terms; an example is shown in FIG. 5. When a term relationship t,x is submitted to the Term Matrix 22 for storage, t is mapped to a row on the y axis and x is mapped to a column on the x axis of the matrix to determine the target cell of the matrix to update. Then the value of the cell is incremented by one. Thus, this records the co-occurrence of the terms and contributes to the its relatedness determination. The larger the value of a cell in the matrix, the more closely related the terms that map to it are.

Typically, the term matrix ends up being fairly large with hundreds thousands of thousands of rows and columns. But this is dependent on how many responses have been input into the system.

Responses Database 224

The Responses database 224 stores all unique responses entered into the system. Responses stored here are used as potential utterances during real chat. Responses are retrieved from this database and ranked. A single response is chosen to show to the user during chat by the response selector. The data within the responses database can be a traditional information retrieval index, or a database with a single table that simply holds records of responses.

Knowledge Matrix 226

The knowledge matrix stores knowledge packets (t,d) derived from the Input Response Learner 224; an example is shown in FIG. 6.

Chat Engine 16

A main control mechanism is the Chat Engine 16. It is the component that has responsibility for accepting an input from clients 8 chatting to the Cybertwin, understanding and interpreting the input, and then drawing an appropriate response from either the Dynamic Cybertwin 12 or the Base Cybertwin 14. It is the Chat Engine 16 that controls the conversation and keeps the user engaged in real humanised dialogue. It does this by intelligently utilising the Knowledge Storage 220 information ultimately to retrieve and rank potential responses.

Figure 7:
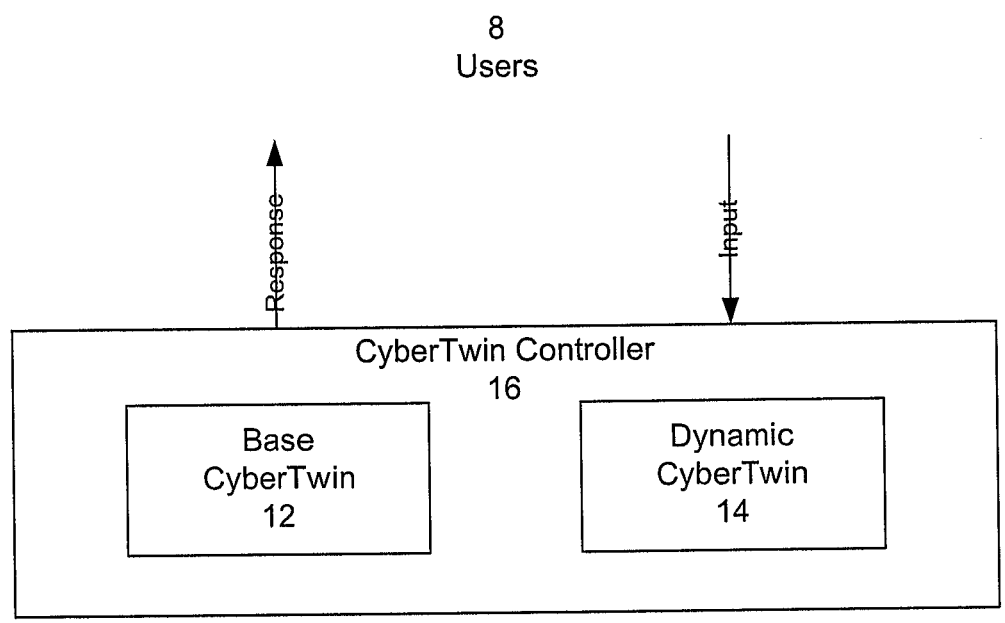
FIG. 7 is a block diagram of the Chat Engine.

The controller operates by first passing the input to the Dynamic Cybertwin 12 to obtain a response. If the Dynamic Cybertwin 12 gives a response, then that response is passed back to the client 8. If no response is given by the Dynamic Cybertwin 12, the same input is passed to the Base Cybertwin 12 and a response is obtained that is returned to the client 8. This is schematically shown in FIG. 7. It is this two phase control procedure that coalesces the Base 12 and Dynamic Cybertwins 24 to provide a robust approach to virtual character generation for chatting.

The Chat Engine 16 uses a combined approach of utilising the conversation thesaurus 24, Input/Responses 25, FAQs 26, questions 27, thoughts 28 and dynamic knowledge base? to select the best response or responses to give to a client 8 input.

Input Interpreter 232

When an input is submitted by a client, it is input into the system via the Input Interpreter 232. It is this component that parses the input into sentences and then into triplets. These triplets are then used to retrieve ideal response triplets from the Knowledge Matrix 226. Since the y rows of the Knowledge Matrix 226 represent input triplets, each row that corresponds to an input triplet identified by the Input Interpreter 232 is retrieved. Each element across the set of rows is summed and averaged to give single vector representative of ideal response triplets. The top ranking X triplets in this final vector can be then extracted and passed as a query to the Response Selector 234 which will use them to retrieve and rank potential responses. For example if the input from the use was:

Input: The dog bolted down the road
The triplets would be
The dog bolted
dog bolted down
bolted down the
down the road
And the retrieved ideal responses would be:
Which road was
road was that
Each ideal response would have a averaged value indicating its overall importance or relatedness to the input:

| Which road was | 0.78 |
| road was that | 0.78 |

These ideal triplets with their relatedness value is then passed as a query to the Response Selector 234, which uses it for the ranking of responses.

Response Selector 234

The aim of the Response Selector 234 is to accept the query output by the Input Interpreter 232 and to use this for the retrieval and ranking of responses. The query, which is a list of terms/triplets and respective importance values, is used to rank responses using the inner product method:

$$score_{Q,R} = \sum_{q \in Q} Q_q \times R_q$$

Where $Q_q$ is the weight of query terms q in the query Q and Rq is the binary weight of either 1 or 0 which reflects the appearance of q in R or not. The response with the greatest score is returned to the user as the Cybertwin's response to the input.

The Conversation Thesaurus 24

The Conversation Thesaurus 24 is a dictionary with groups of conversational statements that are grouped according to similar meaning, just like a conventional thesaurus. The conversational thesaurus has many thousands of entries, each of which represents a core meaning or concept. Each entry has many items that are variable ways of describing that concept. An example thesaurus entry represented the "how are you" concept is:

How are you?
hi how are you
* how are you
* how are you *
how ru
how r u
* how are you today
how are you tonight
* how are you tonight
how are you tonight *
*how are you tonight *
how are you *
how is you
*how is you
how is you *
* how is you *
*and you?
how goes it
how you been
how is it going
how is it going *
how is it going today
* how is it going *

Where the wildcard * means that any number of words could appear in that part of the sentence.

The Chat Engine 16 uses the Conversation Thesaurus 24 as a core component when attempting to retrieve a suitable response for a given client 8 input. If a user's input matches to a pattern item in the Conversational Thesaurus 24, then the Chat Engine 16 will retrieve a user's response for this item.

For every thesaurus entry, a Cybertwin should have at least one response to give. This response has been either manually entered via a lesson 25 or automatically extracted via the dynamic extraction algorithms. In a lesson, a user is asked to submit a response to each thesaurus entry.

Additional Methods of Refining Cybertwin Responses to Simulate Human Conversation Conceptual Mapping Conceptual communities share common interests and values. Examples of conceptual communities could be: teen to mid 20s males with an interest in cars and football; undergraduate students with an interest in politics, the environment, rights; teen to mid 20s males and females with an interest in hip hop and rap music; primary school-age children learning about nature and community.

The intended or understood meaning of word and phrases is often dependent on the conceptual community. For example, the word "dog" or the phrase "was a dog" will have a different common meaning for each of the conceptual communities: unattractive female; friend or buddy; something that was flawed or failed; a canine. The interests, values and commonly-shared meanings of a conceptual community can be mapped. Conceptual maps can be developed and updated based on data drawn from chats, from media sources relevant to conceptual communities, from on-going research in social sciences. Users can at any time be automatically assigned to one or more preexisting conceptual communities (and thus attributed one or more conceptual maps) by the chat engine 16, based on their responses to a registration quiz, their inputs to classrooms, frequency of interactions with members of a particular conceptual community, their use of defining keywords (i.e. words that can be fairly said to belong to one particular conceptual community and not likely to be used or used commonly by other communities). When a conceptual map is assigned the user is automatically noted as being either a strong or weak holder of that map and this notation is updated automatically by the chat engine 16, based on the user's chat responses.

Conversational Contexting

Conversational context can be established from the use of words and phrases in chats. Examples of keywords and phrases could be: "moving house", "my birthday", "federal election", "terrorism", "climate change", "Christmas", "going to the dentist". Conversational contexts are noted as either strong or weak, depending on the frequency of related keywords in the visitor's response (e.g. "moving house", "removalist", "packing", "changing address"; or "party", "birthday", "music", "dancing", "invite"). The designation as either strong or weak is assigned automatically at any time in the chat.

Most chats will involve a blend of conceptual map and conversational context; eg hip hop guy is moving house; undergraduate student is having a birthday. However, some conversations will be dominated by either the user's conceptual map or a particular conversational context.

The chat engine uses chat data from registered visitors to Cybertwin sites to attribute a conceptual map (and holder status) to a visitor and stores this data. The chat engine also uses chat data from registered visitors to Cybertwin sites to create a history of conversational contexts. The chat engine also uses chat data from registered visitors to Cybertwin sites to note key information about the visitor, such as that have just moved house, they are having a birthday party this weekend. Key information is temporally sensitive; e.g. the Cybertwin will cease referring to moving house one week after the visitor stated first mentioned moving house. If the visitor refers to the key information again after the one week has lapsed, the Cybertwin will resume referring to the house move for one week.

The chat engine thus has two sources for a response in addition to the base 12 and dynamic 14 personalities: (i) one likely to be given by a member of the user's conceptual community (i.e. drawn from the user's conceptual map); (ii) one likely to be related to the conversational context; (iii) one drawn from stored data of chats with registered visitors.

If the user has one or more conceptual maps, and/or if the user is a weak holder of a conceptual map, and/or if there is a strong conversational context, the chat engine will give a weighting of 80% to the conversational context and 20% to the conceptual map.

If the user is a strong holder of one conceptual map and there is a weak conversational context, the chat engine will give a weighting of 80% to the conceptual map and 20% to the conversational context.

If the user is a strong holder of one conceptual map and there is a strong conversational context the chat engine will give a weighting of 50% to the conceptual map and 50% to the conversational context.

If the user is a weak holder of a conceptual map and there is a weak conversational context then the user's base personality 12 becomes the source for responses.

An example of this process will now be described.

The client provides the input "I saw a dog on my way home yesterday".

Response options:
(a) I met one at a party last week. She had a had a great personality.
(b) I met one last week, but didn't think she'd be any good in bed.
(c) Did you get anywhere with her?
(d) I love pets, do you?
(e) Why do you keep talking about pets?
(f) What do you like most about dogs?
(g) Do I look like I care about dogs?
(h) Tell me more about dogs If the Cybertwin personality is based on a 50-year-old male who is a weak holder of a conceptual map (goal-directed senior professionals) and the strong conversational context has included the keywords and phrases "sex", "dating", "parties", and "girls", then the chat engine chooses response (a) [IF THE BASE PERSONALITY IS AGREEABLE], (b) [IF THE BASE PERSONALITY IS DISAGREEABLE] or (c) [IF THERE IS NO BASE PERSONALITY].

If the Cybertwin personality is based on an adolescent male who is a strong holder of a conceptual map (adolescent male, non-traditional values) and the strong conversational context has included the keywords and phrases "sex", "dating", "parties", and "girls", then the chat engine chooses response (a) [IF THE BASE PERSONALITY IS AGREEABLE], (b) [IF THE BASE PERSONALITY IS DISAGREEABLE] or (c) [IF THERE IS NO BASE PERSONALITY].

If there is no conversational context, then the chat engine will refer to the conceptual map for a response and: for the 50-year-old male choose (d) [IF THE BASE PERSONALITY IS AGREEABLE] or (e) [IF THE BASE PERSONALITY IS DISAGREEABLE]; for the adolescent male choose (a) [IF THE BASE PERSONALITY IS AGREEABLE] or (b) [IF THE BASE PERSONALITY IS DISAGREEABLE], or (c) [IF THERE IS NO BASE PERSONALITY].

If there is no relevant data in the conceptual map, or the Cybertwin personality is a weak holder of a conceptual map, then the chat engine will refer to the base personality for a response and: for both the 50-year-old male choose (f) [IF THE BASE PERSONALITY IS AGREEABLE] or (g) [IF THE BASE PERSONALITY IS DISAGREEABLE] or (h) [IF THERE IS NO BASE PERSONALITY].

Intelligent Rule-based Cybertwin Control

These tools are specialised tools for the development of compelling lean-forward oriented Cybertwins. They give user the ability to enter content and logic controls to generate powerful, controlled Cybertwins that behave as desired. The lean-forward functionality allows the owner of the Cybertwin to logically control the flow of the conversation, including the questions that are asked and the responses to user input.

The main features are User Interest via Category Profiling, Intelligent Questioning, Intelligent Responding, Lean-forward/Lean-back Switching, API Calling, Database Persistence, and Special Global Rules. Each of these wilt now be described.

User Interest Via Category Profiling

As a general feature across all functions, the Cybertwin owner will be able to create core categories that are of interest and use these as a basis for organising content and controlling conversation flow. Every piece of content that is submitted to the Cybertwin being created (inputs, responses, questions/answers, thoughts, promotional lines, etc) can be labelled as belonging to one or more of the categories. Then, throughout the conversation, the Cybertwin, through owner-generated scripting of logic/rules, will:
  keep tally of which category is of current interest to the user
  keep a tally of which categories (overall) are of interest to the user
  direct flow of conversation.

This information is stored and used to determine exactly what content to use during a conversation. So at any stage, the Cybertwin will be able to tell the owner that a particular user is interested in X, Y and Z categories. This category profile, gives the owner:
1. an amazing amount of control over content and conversation flow
2. a great understanding of user interest.

The category profile can be viewed at any time as it is stored dynamically for every user. It is a rich source of information and plays a central role in the intelligence of the Cybertwin.

Intelligent Questioning

The Cybertwin owner will have the ability to enter questions, along with expected responses and associated rules. These can be used to maintain category records, and ultimately dictate the nature and flow of the conversation. For example, the Cybertwin owner can enter the question:

Do you like to dance to Madonna's music?

and also enter the expected responses and their rules:

yes:
    Rule: +1 Madonna category
    Rule; +1 dance category
    Rule: Go to question "what song do you like of hers?"
no:
    Rule 1: do nothing
maybe:
    Rule 1: +1 Madonna category
    Rule 2: +1 dance category This controls the chat engine so that if the client answers "yes", then increment the tally in the 'Madonna' and 'dance' categories in the user's category profile and go to a specific next question. If the client answers "no", then no specific action is taken. If the client answers with "maybe", the category profile is updated, but no specific next question is asked.

Over time the category profile is updated according to the way the user answers questions (or what the user asks). When selecting a question to ask or a response to give, the category profile is consulted.

With categories and rules, questions can be organised both categorically and hierarchically, so the best questions are asked at the right times.

All answers to all questions are saved in real-time and presented in a report like fashion to Cybertwin owner in real-time.

Intelligent Responding

As all content submitted to the Cybertwin can be labelled according to rules and categories, the Cybertwin can intelligently choose what pieces of content to use depending on the category profile of the user.

The Cybertwin can enter input/response pairs along with rule and category information. For example, let's say the Cybertwin owner expects the user to say:

Input. Where can I find my favourite music?

The response to give is category based:

Rule 1: Madonna category greater than X then give
Response: You can find Madonna's music at . . . .
Rule 2: Dance category>X then give
Response. You can find great dance music at . . . .
. . .
Rule X: ABC
Response: XYZ

Lean-Forward/Lean-Back Switching

The control between lean-forward and lean-back is handled via the rules associated with each piece of content. If a rule says to "do nothing" then the Cybertwin essentially enters lean-back mode, whereas if a rule suggests to go to a next specific question, then the Cybertwin is in lean-forward mode.

API Calling

It is possible to call any web API and have this integrated into the Cybertwin logic and content. For example, a certain question may refer to the latest news that is retrieved dynamically from another website:

Have you heard that this happened: [API_CALL http://xyz.com/news.jsp]

where [API_CALL http://xyz.com/news.jsp] makes a request to dynamically retrieve content from the URL. So, the user may see something like this:

Have you heard that this happened: Madonna had a baby!

API calling can also be using to pass information to an external resource as well, such as storing an answer on another server or updating external items on a user depending on the conversation flow/interest.

Database Persistence

All conversations, answers and user profile information are stored in databases. This information can be viewed at any time by the Cybertwin owner 10. This also allows the Cybertwin to "remember" a client and pick up the conversation where they left off, or refer to past items in future conversations.

Special Global Rules

Additional rules to check for certain events at a global level. These rules could be triggered at any time and any event could be performed. These are some examples of some global rules which are checked consistently throughout the conversation:

If a user uses bad language twice then log them out or do XYZ
If a category count hits a certain number then do XYZ
If the number of conversations a client has had or number of lines covered in a conversation hits a limit, then do XYZ.

Virtual Search

Users need to be able to find services, people, places, events and objects in virtual worlds, such as Second Life. Users also need to be led in their search; they don't always know what it is they are searching for.

Searching in virtual worlds cannot avail of traditional search and indexing techniques, because: there are no hyperlinks, keywords and valid metadata.

Cybertwin avatars can be used for virtual searching: they are essentially a humanised interface to a repository for information about objects, people, places, events and services in the virtual world. They would be aware of how these things are rated by virtual world users, and would use that information to rank their responses. A central Cybertwin avatar would intelligently use the information collected by other Cybertwin avatars. So, a Cybertwin avatar would present as a natural language chatbot avatar which is able to respond to direct user queries, reformulate the query as a keyword query, and retrieve a ranked response from the index. It would be able to guide users to refine their search by suggesting new options or related options. It would tell them how to formulate that as a search query. So for example, as a natural part of the conversation it would ask a series of questions like, "Are you interesting in meeting people, getting some land, or simply finding out what to do in the virtual world?" It could even suggest that in context of a conversation topic, as opposed to a direct search query.

Cybertwin avatars would have the ability to chat to users and store information, without the need for a human to be online directing the avatar. They can be clones of a single representative, a fresh and appealing character, or can also manifest as characters who are fun to interact with, like Paris, George Bush, etc. They can gather high level information such as what to do in the virtual world, what most people do in the virtual world, what people do first, where to meet people in the virtual world, where to listen to music in the virtual world, where to buy clothes and accessories, real estate, etc. They could also gather specific details about objects, services and people.

Ranking

Cybertwin avatars could perform a virtual version of link analysis, 'dynamic in-world referral', which partially solves the issues of lack of metadata, and lack of link information to rank results. Example:

The Cybertwin avatars gather ranking information by asking people their preferences. For example, users would be asked "Where is the best place to listen to live music?" This data would be aggregated and used to rank user preferences. Cybertwins could also create specific ratings by asking questions such as: "What do you think of XYZ?", or "Which of these would you say is better, ABC or XYZ?"

This approach would also help to formulate user search queries to send to the index in the first instance.

Dynamic Questioning and Answering

Dynamic questioning and answering gives the Cybertwin the ability to potentially answer any question posed to it by any user at any time, even if the answer is not stored in its knowledge base. The idea would be to create a live communication channel between the all Cybertwins in the virtual world. So, if there is a question a Cybertwin can not answer, it is passed to multiple Cybertwins that are already engaged in conversation with people. These Cybertwins would receive the question, which could be posed by the Cybertwin to the user it is chatting to. The answer/response from the user, if it is valid and informative, could be passed back to the original Cybertwin and it could make the decision as to what to pass back to the user. There could be hundreds of Cybertwins in the virtual world, connecting with people, chatting, gathering information and dynamically making search requests to get answers back, instantly.

Questions that come from users could also be stored in the index so that Cybertwins could use them in future to keep generating valuable and relevant meta data. The questions that might come from users are best, because they reflect the users' precise information need/s.

Uses of Cyberpersonalities 50

This will be discussed with reference to FIG. 2.

Cybertwin

Expression of a cyberpersonality 52 may be by way of a Cybertwin, being a clone of the user 102, based on their profile, and intended to represent them autonomously online.

A Cybertwin can be productised and released as a client-server software application, where the client application can be downloaded and installed easily. The client application should essentially perform the task of the Content Feeder 200 component of the Dynamic Cybertwin 14 and the use profiling and assignment part of the Base Cybertwin 12. All other functionality should be deployed and running on a publicly accessible web server.

There are only a few initial tasks that have to be performed in the setting up of the Cybertwin. From a user or Cybertwin owner 10 perspective, the following steps clearly outline the initial process of obtaining and establishing their own Cybertwin:

1. Download a Cybertwin client application and register user details.
2. Issue the new home address of the Cybertwin to the user. This is where it lives.
3. Specify the storage directory for the Cybertwin. This is where it learns from.
4. Teach the Cybertwin by giving the classroom content. The Cybertwin reads this content and learns.
5. Advertise to other Internet users the home address of the Cybertwin so they can interact with it.
6. The Cybertwin automatically learns and builds its knowledge by analysing the content given in the classroom.

After step 5 has been performed, there is nothing more the user has ever has to do for the Cybertwin except to issue it content to its classroom. Once setup, the Cybertwin will continually monitor and learn from the content given to it in its directory which is stored locally on the user's computer. It is up to the user 10 to add content to the directory so that it can be monitored 202, parsed 204 and into the Cybertwin system for knowledge generation.

Cybertwin Chat 54

Users own a Cybertwin which chats to others on their behalf, and provides feedback to them about the conversations. Using base and dynamic profile, the Cybertwin expresses itself in conversation. The conversation elements differ in accordance with the conversation output of a particular characteristic. Using our example earlier of a Type Y—Teenage, female chatterbox the conversation elements might be:

Generic comments are skewed to female "oh, that's so cute", agreeable "I love talking to you," impulsive "hey, let's change the subject."

Leading questions are friendly questions designed to lead the visitor into conversation, like "What do you think love is?" They usually lead to a free-form answer from the visitor to the Cybertwin.

Interjections, like "coooool."

Profiling questions, questions you want to score your visitors on, or receive feedback on, for example, "Where is the best party on Saturday?".

Knowledge base, for example if the visitor says "'What's the latest?" the Cybertwin has a definition of love in it content knowledge base, it is able to give a known answer: "I've broken up with Danny, and on Saturday I am going to PARTY at DJ's to get soooo over him".

Responses to particular patterns, such as the ratio of comments to questions, of interjections to comments, of declamations to questions or supportive comments, etc.

Cyberagent 56

A Cybertwin agent is a representative of the user, that uses the profile to act on the user's behalf to select content, find other users or select products and adverts. The characteristics of an individual, or of a group to which an individual have been assigned, are used to modify queries to an index, to personalise:

Search results for content.

Search for another individual, of a certain characteristic pattern (egg taste in music, romantic compatibility, etc).

Choice of product for placement/advertising/or to shortlist when the user requests and item, like a new video to watch or music to download.

Choice of media modality to offer the user, and other features.

Corporate Cybertwin 58

A corporate cyberpersonality is a representative of a commercial website or blog that talks to visitors, helps them search, and provides the site owner feedback. This cyberpersonality will have the attributes designed for it according to its marketing requirements.

Virtual Avatar 60

A virtual avatar is a more embodied form of the chat Cybertwin, including facial expressions, preferred activities in virtual environments, and richer indications of personality like voice tone, activity level, etc.

Other Manifestations in the Context of Online Communities 70:

In one form 72 the cyberpersonality may select a group or community on the basis of characteristics, to seed an invitation to join a specific community, for a marketing campaign or product placement.

Alternatively 74 the cyberpersonality may analyse a community's behaviour, for example in response to a company initiative, like introduction of a new product or feature.

A Dating Application Example

DateCybertwin rests on the fact that certain psychological and attributes are strong predictors of attraction, and can be used to match human beings more accurately than using the indicators commonly used in dating sites, like race, hobbies, religion. However, instead of relying on the user reading questions and completing questionnaires by clicking on answers, DateCybertwin asks questions within a conversation, or analyses the user's self-description, and uses that to make a profile, then to rank the results shown for relevance and to match others of a similar profile.

DateCybertwin has an engaging, free-flowing conversation with a user. During the conversation, she analyses what the client says, and uses that to rank results and score others for compatibility.

The DateCybertwin's intelligence is not just restricted to the conversations she has with clients. Even if the user decides not to have a chat, or does not want to be 'analysed' by having a conversation, DateCybertwin is able to analyse the information people give, and conduct a powerful search for compatible members.

The user is then given a shortlist of the most relevant other members, that is, the people the member is going to be attracted to the most based on deep, underlying characteristics that make one person attractive to the other.

And, in addition, the user is given a compatibility score in the form of a bar graph, showing the level of compatibility the other member has with the original member. This is based on the similarity of score between the highest-scoring characteristics of the two members.

A quick compatibility score can be delivered simply by reading both profiles, understanding and analysing them psychographically, and then using this as a basis for intelligently assessing their compatibility.

Cyberpersonalities in an Educational Context

In the context of education, Cyberpersonalities can be used as a replacement for or adjunct to traditional teaching methods. Cyberpersonalities can be used to deliver individualised interactive extension programs for gifted and talented children; individualised interactive remedial programs for underperforming children; supplementary tutoring programs; correspondence or distance education programs; programs for home schooling. Cyberpersonalities can be used to provide educational content in answer to questions posed by students, and can incorporate multi-media material and use of web pages (via API calling). Cyberpersonalities can also assess a student's abilities (including via standard forms of IQ and other psychographic testing) and performance by delivering questionnaires and analysing user-generated content. Assessment reports can be delivered to the student user, to teachers and tutors and/or to student user's caregiver/s. Cyberpersonalities can provide individualised feedback and develop individualised educational programs based on assessment results. Cyberpersonalities can also be used in providing career counseling through the use of profiling to assess a student user's strengths and interests.

Cyberpersonalities in the Context of Psychological Assessment and Treatment

In the context of psychological assessment and treatment Cyberpersonalities can be used to perform psychographic profiling and other forms of profiling and to produce assessment reports; including, for example, to the user for career counseling and to a third part client for appraisal of potential employees. Cyberpersonalities can also be used to provide dialogue-based therapy and psychoanalysis, engaging in chat with a client user, storing and analysing his or her responses and responding with comments and questions.

Cybertwins as a Method of Providing Help and Support

Cybertwins are a method of creating chat robots to provide customer support, by answering user's frequently asked questions. Chatbots have been used in this way before, for example Microsoft Windows Live agents, however, the Cybertwin method differs in the following ways:

it allows for rapid creation of a chatbot using pre-trained base personalities, and separation of the way the user answers the chatbot's questions, to allow for easy viewing;

customised lessons, which allow a normal person with no technical skills to develop a chat robot;

dynamic retraining. When a user views the way the conversation their Cybertwin had, and the way their chat robot answered a questions, a user can instantly retrain the chatbot if they don't like the response. This is done by adding a link called 'teach' next to the responses. If the user click the teach button, it automatically submits the input to Frequently Asked Questions;

Frequently asked questions are handled differently to other inputs.

The Cybertwin looks there for a response first, and prioritises FAQ responses

The Cybertwin analyses significant keywords, (non-significant words are words like 'and'), and can use this analysis to deliver approximate matches to an FAQ.

The user can set an FAQ to be answered if it is an approximate match to the original FAQ, an exact match, or if all the significant words are present but in a different order.

Cybertwins can automatically build FAQ, by the owner submitting content to the Cybertwin for automatic training, or creation of the FAQ database on inputs and responses.

Cybertwins to Initiate Users in New Environments

A Cybertwin is forced to guide the conversation in a certain way, to help users through an initiation process. The Cybertwin gives the user sequential initiations information. This is blended in naturally with regular chat. The Cybertwin can also ask questions, like "Have you used this site before?", and use the response to change the content and sequence of the initiation process. They may also ask things like "Do you know how to do what I have just taught you?". If the user says no, the Cybertwin can repeat the previous step.

Cybertwins as Screening Agents on Social Networks

Cybertwin owners use their Cybertwins to screen people who wish to contact them on a social network. They log their Cybertwin in as themselves, or direct people to their Cybertwin. The owner then views conversations, and views answers, and uses that to determine which visitors they should contact Cybertwins as a Method for Users to Create a Full Digital Clone of Themselves The clone not only chats but functions in other ways too, such as:

search and compile information on behalf of its owner;

talk to other people, meet them and screen them on behalf of their owner;

complete defined tasks on behalf of their owner, like attend meetings and record the conversations, and ask questions;

seeking out products and services, or information by gathering community feedback, asking people it has a chat with, or asking search databases.

The clone delivers this agent-like personalised functionality using information it has about its owner, including information about the base personality, the owner's responses to questions, and the owner's conceptual maps and knowledge base.

It can also deliver this functionality by asking the owner to train it to ask particular questions, of other users or of databases it encounters, and then using the answers to compile the information or complete the task, Cybertwins as Brains for Mechanical Robots Cybertwins are used to provide 'personality' to artificial humanoids or mechanical robots. The owner can even customise their own robot, by changing its base personality, and providing it with training. The robots can then functions as above, or provide human companionship.

Cybertwin Chatbots as a Method for Community Seeding and User Engagement

Some examples include: set up a niche virtual community around online gaming, or emo music, or weight loss.

- invitations sent out via bets, either targeted as per profiling above, or embedded in relation to topics of conversation;
- representative bots 'live' in the community website or virtual space, for example sony bot, game character bot, bot for an emo band, or representing an area of interest like weight loss recipes;
- users congregate, get special lessons for their Cybertwins, specialised for the area of interest. Send their bots out into multiple environments (profile pages on social networks like Facebook, online games, blogs, websites, instant messaging, etc).

A method of creating a medium of social exchange,

This enables sponsors to:

- train chat robots to talk to and interact with users. The robots can represent their company, or can be fun characters;
- allow users to create their own chat robots, which are a digital representative of that user but contain embedded sponsored messages. These user chat robots are then sent out into multiple environments.

In this use of the technology, publishers or advertisers pay a fee to sponsor a community. The community will be formed around an area of allied interest to the publisher product.

For example, a health insurance company, Nike, and Weight Watchers, all join together to create a community where users can meet and discuss issues relating to health and weight loss, and to view content relating to topics of interest. This community can live as an element within a social network or virtual world, or as a standalone site.

The sponsors can pay:

a flat fee to seed the community;

a fee per member, in which they pay per member joining;

a fee per engagement, where they pay for the aggregated engagement time, or the length of time users collectively spend interacting within this sponsored virtual community.

Chatbots as a Method for User Segmentation and Analysis in a Social Network or Virtual World Grouping people with similar profiles.

Profiles can be ascertained by Cybertwin asking users direct question.

Using this to deliver targeted content, products or advertising.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of operating a computer system to provide a conversational agent to mimic a user, the method comprising:

providing a database accessible by the computer system, the database including a base personality component selected from a plurality of personalities, and a learning personality component capable of learning from content via at least only one modality attributable to a user so as to also mimic the user;

receiving in the computer system an input message from at least one of a client or an audience;

processing in the computer system content of the input message to determine one or more candidate responses corresponding with at least one of the base personality component or the learning personality component, wherein the learning personality component capable to perform additional learning from additional content via the at least only one modality attributable to the user to determine one or more candidate responses; and generating in the computer system an output response message directed to said at least one of a client or an audience, and comprising a selected one of the candidate responses.

2. The method of claim 1 comprising selecting the base personality component from a database which includes one or more personalities, based upon one or more personality models.

3. The method of claim 1 comprising selecting the base personality component from a database which includes a plurality of personality characteristics, wherein the base personality component combines two or more personality models.

4. The method of claim 2 comprising identifying the one or more personality models of the base personality.

5. The method of claim 4 wherein the identifying the one or more personality models employs one or more of: user responses to direct questions; user expression derived from online activity of the user; or group associations of the user.

6. The method of claim 2 wherein the database further includes one or more base personality typologies, and the base personality component comprises a combination of one or more of the personality models into one of the base personality typologies.

7. The method of claim 1, further comprising the learning personality component storing knowledge for subsequent response generation, wherein the knowledge is generated from processing additional content via at least only one modality attributable to a model user.

8. The method of claim 7 wherein the content comprises one or more of inputs and/or responses of the model user to the conversational agent; questions and/or corresponding answers provided by the model user; remarks and/or statements provided by the model user; inputs and/or responses of the model user recorded from an exchange with another conversational agent; and/or feedback provided via one or more interactions with the conversational agent by other users familiar with the model user.

9. The method of claim 7 wherein the processing comprises using one or more knowledge extraction processes.

10. The method of claim 1 further comprising: monitoring sources of user content; retrieving user content identified in the monitored sources; extracting knowledge pertaining to the user from the retrieved content; and using the extracted knowledge for subsequent response generation.

11. The method of claim 10 wherein the sources of user content comprise one or more of: instant messaging content; email content; speech-to-text content; blog content; and/or online content identified as of-interest to the user.

12. The method of claim 1 further comprising the learning personality component storing knowledge for subsequent response generation wherein the knowledge is generated from processing additional content via at least only one modality attributable to the user; wherein the learning personality component stores knowledge for subsequent response generation by:
processing additional content via the at least only one modality attributable to the user to generate usable knowledge; storing the usable knowledge in a knowledge base; and using the knowledge base to process content of the input message to determine one or more candidate responses.

13. The method of claim 12, wherein the processing further comprises:
parsing the additional content to identify at least one response; extracting from the response terms and relationships between terms; and storing extracted term relationships in a term matrix within the knowledge base.

14. The method of claim 13 further comprising storing unique responses in a response database within the knowledge base for subsequent retrieval as candidate responses to input messages.

15. The method of claim 12 wherein the processing further comprises:
parsing the additional content to identify one or more input-response pairs;
extracting one or more input-response pairs to generate one or more knowledge packets from the additional content; and
storing the knowledge packets in a knowledge matrix within the knowledge base.

16. The method of claim 15 wherein a knowledge packets comprises pairings of substrings comprising an input and a response.

17. The method of claim 16 wherein in a pairing of substrings in a knowledge packet, a substring comprises a three-word triplets.

18. The method of claim 1 wherein the processing content of the input message further comprises:
determining whether any candidate responses are available corresponding with the learning personality component and/or whether any candidate responses are available corresponding with the base personality component; ranking available candidate responses substantially according to a relationship with the input message; and selecting a response from the candidate responses based substantially upon the ranking.

19. The method of claim 18
wherein the database includes a conversational thesaurus comprising corresponding entries with a plurality of concepts; processing the input message to identify concepts appearing within the conversational thesaurus; and, in the event that a concept is identified, determining a candidate response associated with the identified concept.

20. A computer-implemented system for providing a conversational agent to mimic a user, the system comprising: a computer system; and
a database which comprises a base personality component selected from a plurality of personalities to mimic the user, and a learning personality component capable of learning from content via at least only one modality attributable to the user so as to also mimic the user;
an interface to receive an input message from at least one of a client or an audience user;
a chat engine to process content of the input message to determine one or more candidate responses corresponding with at least one of the base personality component or the learning personality component wherein the learning personality component capable to perform additional learning from additional content via the at least only one modality attributable to the user to determine one or more candidate responses; and
an output interface to output a response message directed to the at least one of a client or an audience, and comprising a selected one of the candidate responses.

21. The system of claim 20 comprising:
a knowledge base; and a knowledge learning engine to process content via the at least only one modality attributable to the user to store knowledge in the knowledge base generated from processing the content, wherein the chat engine to access the knowledge base to determine one or more candidate responses.

22. The system of claim 21 comprising:
a parser to parse additional content via the at least only one modality attributable to the user to identify at least one response; and
a response learner to extract terms and relationships between terms, and to store the extracted term relationships in a term matrix within the knowledge base.

23. The system of claim 22 wherein the response learner is further to store unique responses in a response database within the knowledge base for subsequent retrieval as candidate responses to input messages.

24. The system of claim 21 comprising:
a parser to parse additional content via the at least only one modality attributable to the user to identify one or more inputs-response pairs;
an input response learner to extract one or more knowledge packets from the input and from the response, and to store the knowledge packets in a knowledge matrix within the knowledge base.

25. The system of claim 24 wherein a knowledge packet comprises pairings of substrings comprising an input and a response.

26. The system of claim 25 wherein in a pairing of substrings in a knowledge packet, a substring comprises a three-word triplets.

27. The system of claim 20 wherein the chat engine is further to: determine whether any candidate responses are available corresponding with the learning personality component and/or whether any candidate responses are available corresponding with the base personality component; rank available candidate responses substantially according to a relationship with the input message; and select a response from the candidate responses substantially based on the ranking.

28. The system of claim 20 further comprising a monitor to identify and retrieve additional content via the at least only one modality attributable to the user for use by the learning personality component.

29. The system of claim 28 wherein the monitor comprises a software component residing on a client computer located remotely from the chat engine, which also comprises a software component residing on a server, the monitor to upload retrieved content to the server via a data network connection.

30. The system of claim 28 wherein additional content comprises one or more of: instant messaging content; email content; speech-to-text content; blog content; and/or online content identified as of interest to the user.

31. A non-transitory and tangible computer-readable storage medium having program instructions stored thereon which, when executed by a processor, cause the processor to implement a method comprising:

accessing a database associated with the computer system, the database containing a cyberpersonality data structure which comprises a base personality component selected from a plurality of predefined personalities, and a learning personality component configured to acquire and store knowledge for subsequent response generation based upon user inputs and user related information, wherein the base personality component and learning personality component are each configured to provide responses to input messages from at least one of a client or an audience;

receiving an input message from at least one of a client or an audience;

processing content of said input message with the cyberpersonality data structure to determine one or more candidate responses corresponding with at least one of the base personality component or the learning personality component of the cyberpersonality data structure; and generating an output response message directed to at least one of a client or an audience, and comprising a selected one of said candidate responses.

32. The apparatus of claim 20, wherein the learning personality component capable to perform additional learning from additional content via the at least only one modality attributable to the user to determine one or more candidate responses is capable to perform additional learning via learning which terms are related and extracting that knowledge from the additional content.

* * * * *